United States Patent [19]
Yuris et al.

[11] 4,247,759
[45] Jan. 27, 1981

[54] SELF-SERVICE PASSENGER TICKETING SYSTEM

[75] Inventors: Yuris Nora, Del Mar; Eugene J. Cekander; Masaru Kazaoka, both of San Diego; Jim P. Chuang, Escondido, all of Calif.

[73] Assignee: Cubic Western Data, San Diego, Calif.

[21] Appl. No.: 949,975

[22] Filed: Oct. 10, 1978

[51] Int. Cl.³ ............. G07F 7/08; H04Q 1/52; G06K 19/06
[52] U.S. Cl. ............. 235/381; 235/493; 340/153
[58] Field of Search ......... 235/380, 381, 382, 493; 235/379; 340/149 A, 152, 153 R

[56] References Cited
U.S. PATENT DOCUMENTS

| | | | |
|---|---|---|---|
| 3,445,633 | 5/1969 | Ratner | 235/381 |
| 3,622,995 | 11/1971 | Pilks | 340/153 |
| 3,750,103 | 7/1973 | Angus | 340/153 |
| 3,760,164 | 9/1973 | Kral | 235/493 |
| 3,931,497 | 1/1976 | Gentile | 235/381 |
| 3,941,977 | 3/1976 | Voss | 235/381 |
| 3,943,335 | 3/1976 | Kinker | 235/381 |
| 3,949,501 | 4/1976 | Andrews | 235/493 |
| 4,020,326 | 4/1977 | Coulthurst | 235/381 |
| 4,023,013 | 5/1977 | Kinker | 235/379 |
| 4,079,354 | 3/1978 | Nitta | 340/152 R |
| 4,085,313 | 4/1978 | Van Ness | 235/381 |
| 4,109,238 | 8/1978 | Creekmore | 235/379 |

*Primary Examiner*—Robert M. Kilgore
*Attorney, Agent, or Firm*—Brown & Martin

[57] ABSTRACT

A system is disclosed for issuing airline tickets without the intervention of any ticket agent. The system includes a plurality of electro-mechanical ticket terminals in communication with a central computer. Each of the terminals has a card reader, a modem, destination select buttons, and a printer. In operation, the card reader reads data from a magnetic strip on a ticket purchasers credit card and the modem transmits signals identifying this credit card to the central computer. Subsequently, the modem receives signals from the central computer indicating good or bad credit. The push buttons are provided on the terminal to enable the purchaser to manually select his destination; and the printer prints a ticket to the selected destination conditional on the credit check signals received from the modem.

4 Claims, 6 Drawing Figures

SELF-SERVICE PASSENGER TICKETING SYSTEM

BACKGROUND OF THE INVENTION

This invention relates to methods and systems for issuing airline ticket to passengers. In the past, such ticket issuing always required the intervention of a ticket agent. One problem with this prior art system, however, is that it is simply too slow. Consequently, long lines of persons waiting for their ticket are a common sight in any airline terminal.

The above problem is overcome in the disclosed invention through the use of sophisticated electronic technology. This technology is combined to form a fully automated passenger ticketing system. No intervention by a ticket agent is required. As a result, ticket issuing bottlenecks are eliminated. The total time required to issue one ticket is less than 10 seconds.

Further, the system is easy to use and can be operated by all passengers. In the preferred embodiment the terminal has a visual display that directs each passenger through a sequence of steps to obtain his ticket. Also in the preferred embodiment, various checks are made based on information received from the travelers credit card prior to the issuance of a ticket. These checks allow only certain types of credit cards to be accepted, for example.

Therefore, it is one object of the invention to provide an improved passenger ticketing system.

Another object of the invention is to provide a passenger ticketing system that is fully automated.

SUMMARY OF THE INVENTION

These and other objects are accomplished in accordance with the invention by a system that includes a plurality of electro-mechanical ticket terminals in communication with a central computer. Each of the ticket terminals includes a credit card reader, a modem, a plurality of destination selection push buttons, and a printer. In operation, the ticket purchaser manually slides his credit card through the card reader. In response, the terminal transmits electronic signals via the modem to the central computer. There, the credit check is made and signals indicating the results of the check are transmitted back to the terminal. Simultaneously while this is occurring, the purchaser is directed via a visual display to manually select a destination by means of the push buttons. Also, he is directed to select either a round trip ticket or a one way ticket. Then, dependent on whether the central computer reports the purchasers credit as being good, the terminal calculates the fare and prints the ticket.

BRIEF DESCRIPTION OF THE DRAWING

Preferred embodiments of the invention will best be understood by referring to the following detailed description when read in conjunction of the accompanying drawings wherein.

DETAILED DESCRIPTION

Figure 1:
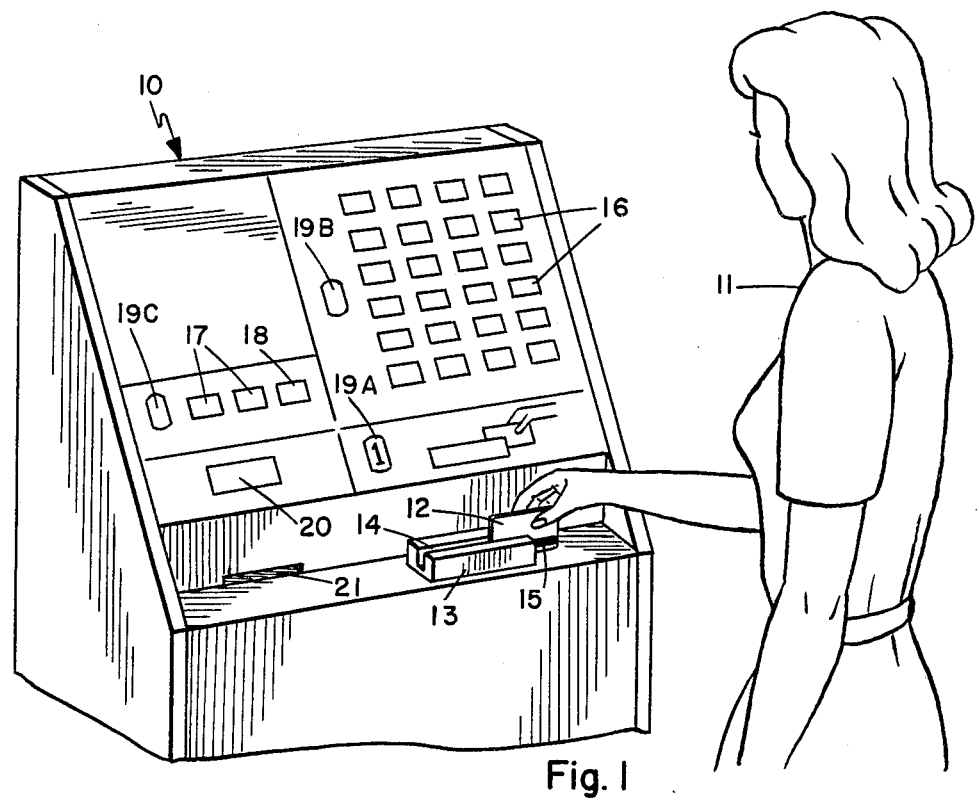
FIG. 1 is a pictorial view of the disclosed ticket terminal in operation.

Referring now to FIG. 1, a system for issuing airline tickets without the intervention of any ticket agent will be described in detail. The system includes a plurality of electro-mechanical ticket terminals, one of which is indicated via reference numeral 10. These terminals are placed at locations that are convenient to potential ticket purchasers. To obtain a ticket, a purchaser 11 first slides his credit card 12 through a card reader 13. Reader 13 includes a slot 14 for guiding card 12 past the read heads. Various information is read from a magnetic strip 15 on the card as it passes through the reader.

After this information is read from strip 15, the electronics within terminal 10 transmits signals that identify the credit card to a central computer. There, a credit check is performed on the card. Subsequently, terminal 10 receives signals from the central computer indicating whether the credit is good or bad. Based on this information, and on other checks which terminal 10 performs, a ticket either will or will not be issued. This checking sequence and the hardware for performing it will be described in greater detail in conjunction with the FIGS. 2 through 6.

As the above checks are being performed, passenger 11 selects a particular destination. A total of twenty-four destination buttons 16 are provided for this purpose. Each of the buttons 16 has a particular destination associated with it; and a destination is selected simply by depressing the corresponding button. Subsequently passenger 11 selects either a one way ticket or a round trip ticket. A pair of buttons 17 are provided for this purpose. Also, another push button 18 is provided which is marked "CANCEL". It allows the ticket purchaser to abort any ticket selection sequence and begin a new one.

Terminal 10 further includes three indicators 19a, 19b, and 19c which direct the ticket purchaser through the ticket selection sequence. In FIG. 1, indicator 19a is illustrated as being turned on. It directs purchaser 11 to perform step number 1. Indicators 19b and 19c respectively direct the purchaser to perform steps 2 and 3.

Terminal 10 also operates to give purchaser 11 additional messages via a visual display 20. These messages include "wait for ticket" and "see ticket agent". The former message is given when each of the three manual steps is performed correctly and no reason for not issuing credit to the passenger is detected by the terminal. In that case, the actual ticket is dispensed through a slot 21. Conversely, the latter message is given when some reason for not issuing credit to the purchaser is detected by the terminal.

Figure 2:
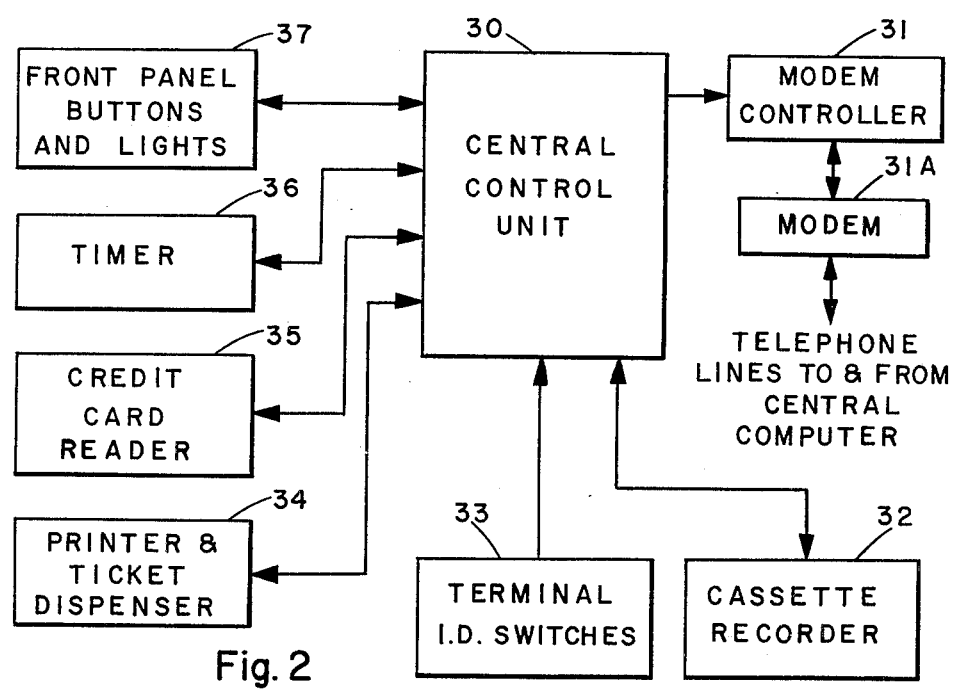
FIG. 2 is a block diagram of the electronics within the terminal of FIG. 1.

A block diagram of the electronics in terminal 10 will now be described in conjunction with FIG. 2. As therein illustrated, these electronics includes a central control unit 30 which is in communication with and controls various special purpose modules 31 through 37. Control unit 30 provides all of the intelligence in the terminal. That is, modules 31 through 37 simply respond to commands from the central control unit.

Module 31 is a modem controller. It operates to provide a communication link between control unit 30 and the central computer through a modem 31a. Basically, in response to commands from control unit 30, module 31 sends messages to the central computer requesting a credit check on a particular credit card, and sends signals indicating the results of the check to unit 30.

Module 32 is a magnetic tape cassette recorder. It provides the means whereby control unit 31 stores a permanent record of each of the ticket dispensing transactions that are made. The cassette itself is removable from the ticket terminal. This allows various off line bookkeeping operations to be performed on the stored data.

Module 33 includes a plurality of terminal identification switches. The setting of these switches uniquely define each terminal. For example, these switch settings indicates the city in which the terminal is located, the terminal location, and the terminal number.

Module 34 is a printer and ticket dispenser. Basically, it responds to commands from control unit 30 to print and dispense the airline tickets. These commands direct the printing on a character by character basis.

Module 35 is the credit card reader. The previously described manually operated slide through read mechanism 13 is part of this module. Basically, the module operates to sense any data recorded on magnetic strip 15 and to convert this data to logical signals for control unit 30 to sense and interpret.

The remaining modules 36 and 37 respectively are a timer module and a light/push button module. Timer module 36 operates to provide the hour, day, month, and year to control unit 30. This information is used, for example, to determine whether or not the credit card has expired. In comparison, module 37 provides an interface to the lights and switches on the terminal which were previously described in conjunction with FIG. 1. Basically, the module forms a 6 bit code that indicates which of the switches has been depressed; and it responds to a 6 bit code from the control unit to illuminate various ones of the lights.

As was mentioned above, all of the intelligence in terminal 10 is included in the central control unit 30. This intelligence is indicated by the flow chart of FIG. 3. First, control unit 30 initializes itself. This operation includes the resetting of various registers that are internal to the control unit; and also includes the reading of the information contained in the switches of module 33. Subsequently, control unit 30 illuminates light 19a. This indicates that the terminal is ready for a credit card to be passed through the card reader. Then the control unit waits for a signal from card reader module 35 indicating that a credit card has been read.

Upon the detection of a credit card, control unit 30 sends a command to timer module 36 which starts a ten second timer. This timer is set to prevent "silent deaths". If the ticket selection sequence is completed within ten seconds, then the timer will be reset by the control unit; otherwise the timer will signal the control unit to terminate the ticket selection sequence.

Next, control unit 30 illuminates light 19b. This indicates that a destination should be selected. Then, the control unit makes various status checks on the credit card that was read. These include a parity check, a check on the type of card, a check as to whether the card has expired, and a check on the number of transactions made at this terminal with the card. A parity error may be caused by a variety of things such as a ticket purchaser inserting his credit card upside down in the card reader for example. In the event of such an error, control unit 30 displays a message in display 20 and returns to point "A" in the flow chart.

If no parity error occurs, then the card type check is performed. Each credit card has digits recorded on its magnetic strip that identify the card type. For example, the digits 37 identify an American Express card. These card type digits are compared with a predetermined list that is stored within the control unit 30. By this means, the ticket terminal is able to selectively accept or reject particular card types. Also recorded on each credit card is a set of numbers identifying when the card expires. These numbers are compared by control unit 30 against the present date as received from timer module 36. By this means, expired credit cards are rejected without interrogating the central computer.

The number of transactions check operates to limit the maximum number of tickets that can be obtained from a ticket terminal at one time. For each ticket that the terminal issues, it stores the corresponding credit card number. Subsequently, when another ticket is requested, the list of previously used credit cards is interrogated. And if this list shows that five tickets were already obtained by that credit card, than a message "see ticket agent" is displayed via display 20, and control unit 30 returns to point A.

When all of the status checks are passed, control unit 30 directs modem controller 31 to send a message to the central processor. This message identifies the credit card which is presently being operated on. Upon receipt of this message, the central processor performs various checks to determine whether the card holders's credit is good or bad. It then sends signals indicating this determination back to modem controller 31.

This response from the central processor is interrogated by control unit 30. If the response indicates the card holder has bad credit, then the ticket selection process terminates. Conversely, if a good credit status is indicated, then control unit 30 monitors module 37 until a destination has been selected. When that occurs, the control module illuminates light 19c, which indicates that a one way or round trip ticket should be selected. After that selection is made, control unit 30 uses the destination select information and the round trip/one way information to calculate the fare. Pricing data to each of the various destinations is stored in a programmable ROM within the control unit.

Subsequently, control unit 30 directs printer module 34 to print a ticket. Also, the control unit directs the cassette recorder 32 to record on the cassette, all of the information that was printed on the ticket. This includes the date, destination, fare, ticket number, and credit card number.

Figure 3:
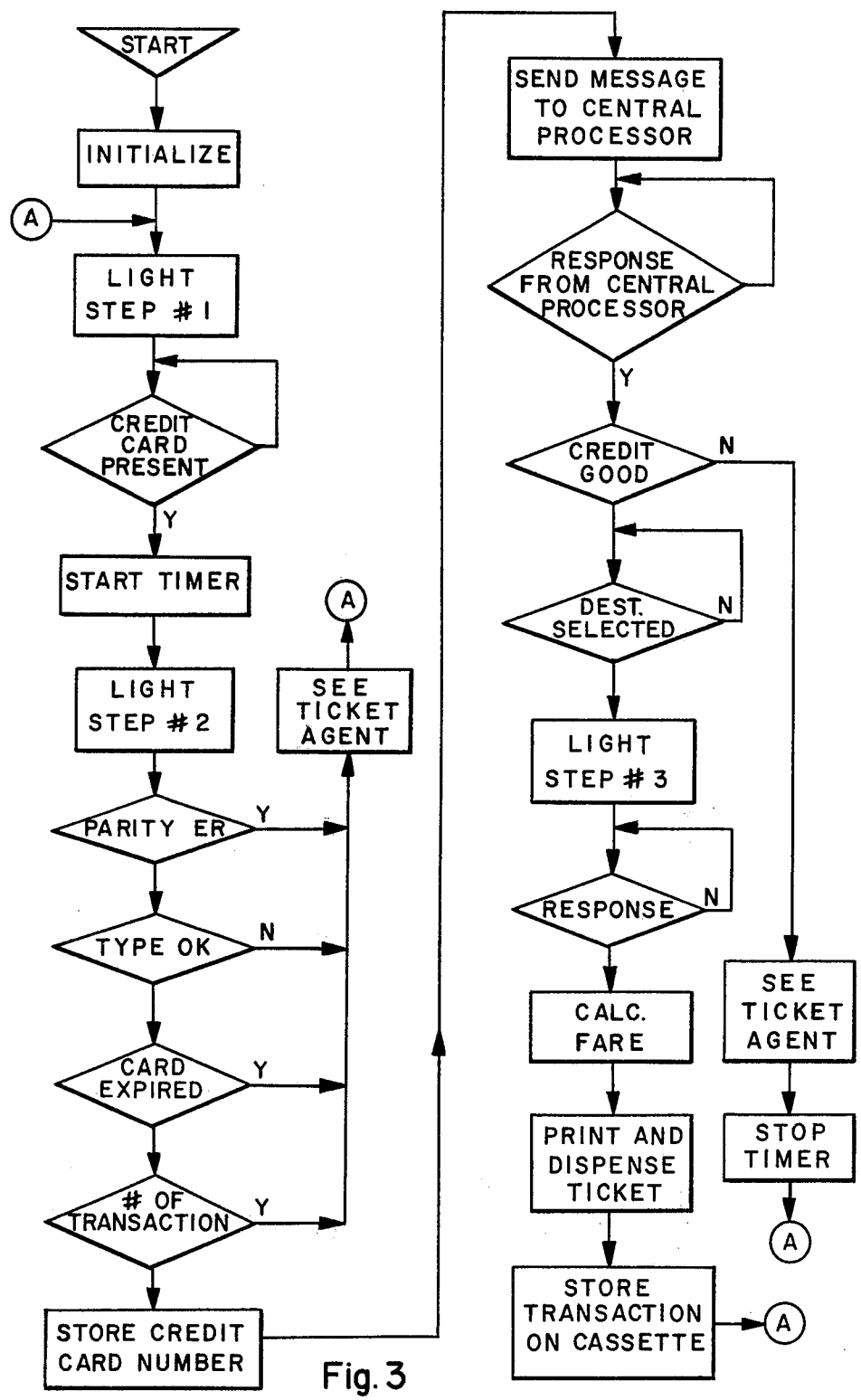
FIG. 3 is a flow chart of the major functions that are performed by the electronics of FIG. 2.
Figure 4:
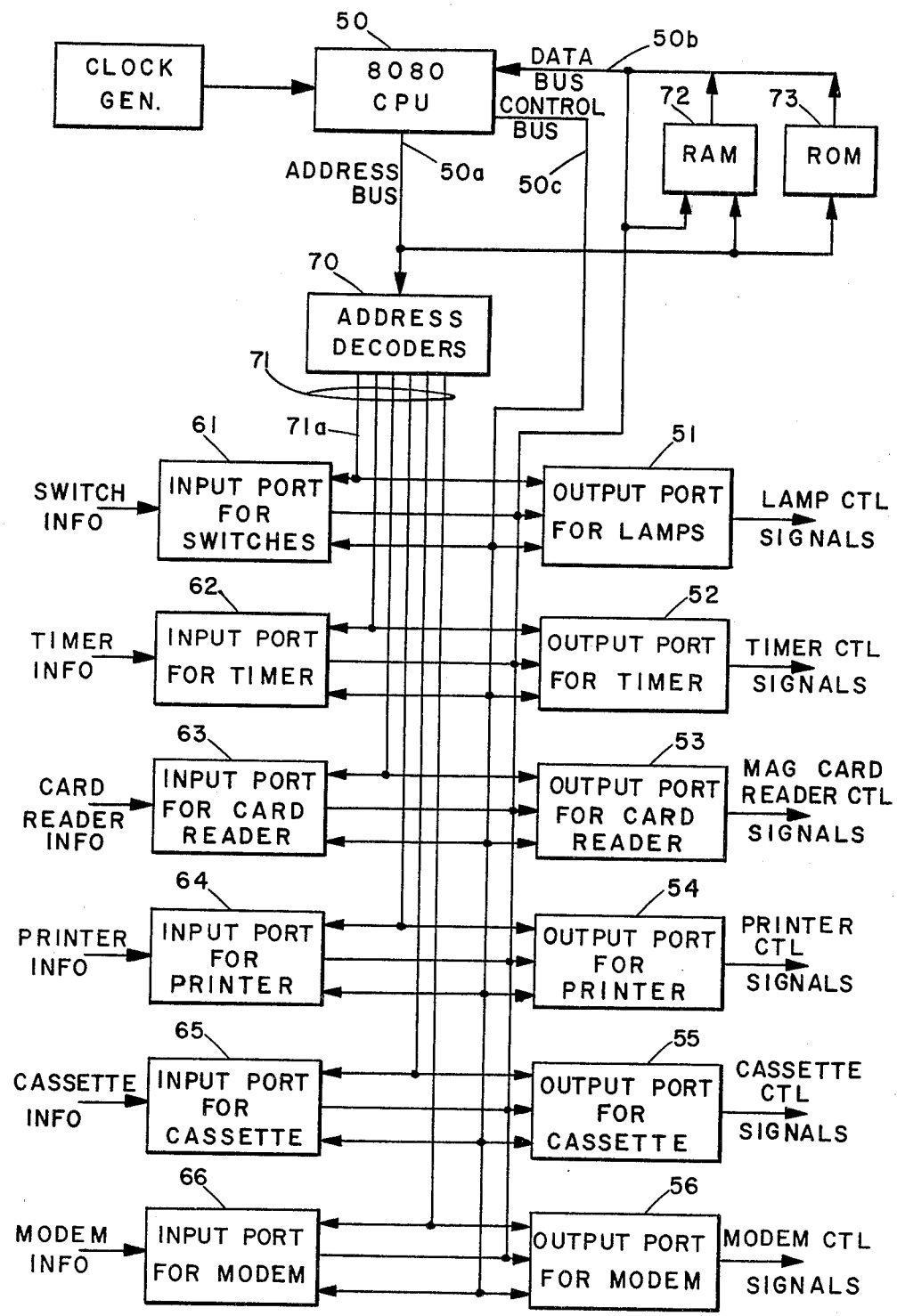
FIG. 4 is a detailed block diagram of the central control unit in FIG. 2.

All of the functions in FIG. 3 are initiated and controlled by control unit 30. A detailed block diagram of this control unit will now be described in conjunction with FIG. 4. Basically, the control unit is comprised of a micro-processor chip 50, a plurality of output ports 51 through 56, and a plurality of input ports 61 through 66. The output ports provide a means for micro-processor 50 to send commands to each of the previously described modules 31 through 37. Similarly, the input ports 61 through 66 provide a means for receiving information signals from modules 31 through 37. FIG. 4 illustrates which ports connect to which modules.

Communication between processor 50 and the various ports is provided by means of an address bus 50a, a data bus 50b, and a control bus 50c. In one preferred embodiment, the address bus is sixteen bits wide, the data bus is eight bits wide, and the control bus is one bit wide. This embodiment may suitably be implemented with processor 50 being an 8080 type micro-processor.

Address bus 50a in conjunction with the control bus 50c provide the means for selecting each of the ports. To this end, address bus 50a is decoded by an address decoder 70. This decoder has various outputs 71, each of which connects to one input port and one output port. Selection between an input port or an output port is made by signals on control bus 50c. For example, suppose the signals on address bus 50a are such that decoder 70 generates a select signal on lead 17a. Under these conditions, a high logic state of control bus 50c operates to select output port 51, whereas a low logic state of control bus 50c operates to select input port 61.

Data bus 50b is used to transmit data to the output ports and receive data from the input ports. This is achieved by constructing each of the output ports as a triggerable register, and by constructing each of the input ports as a register with logically selectable output. Preferably, both the input ports and the output ports are comprised of INTEL 8212 chips.

Also included in control unit 30 is a RAM 72 and a ROM 73. Basically, the RAM is used as a work area for micro-processor 50. In the preferred embodiment, it has a capacity of 512 bytes. By comparison, ROM 73 holds instructions for the micro-processor. These instructions are executed by micro-processor 50 in various sequences to carry out all of the functions that were previously described in conjunction with FIG. 3. A listing of the instructions in ROM 73 is included herein as Table 1.

A portion of ROM 73 also stores various data which micro-processor 50 can interrogate as needed. For example, data includes pricing information to the various destinations. Preferably, the ROM chips that hold this data are packaged on a separate card or in socket holders which allow them to be easily changed.

Figure 5:
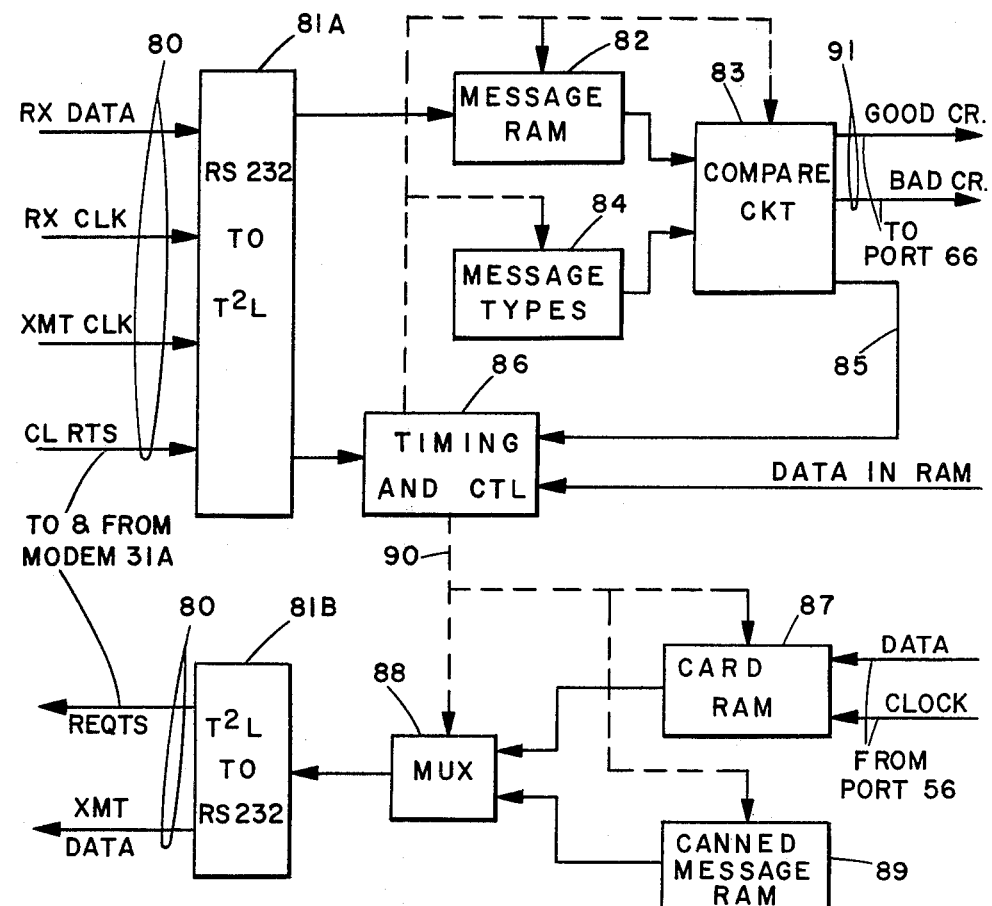
FIG. 5 is a detailed block diagram of the modem controller of FIG. 2.

Referring now to FIG. 5, a detailed block diagram of modem module 31 will be described. This module includes an interface 80 which meets RS232 standards. Receivers 81a are provided for receiving signals from the RS232 interface and for converting them to $T^2L$ logic levels. Similarly, transmitters 81b are provided for converting $T^2L$ signals to RS232 levels. The actual modem to which this interface connects is a VADIC full duplex model 2430.

In operation, the central processor sequentially polls each ticket terminals to determine whether or not that terminal has a credit card to be checked. All messages that are received from interface 80 are first stored in a message storage RAM 82. Subsequently, after the message is received, it is sent to a message compare circuit 83. This circuit has a second input from a ROM 84. This ROM contains the format of various messages which the terminal is to recognize.

If the message in RAM 82 is determined by compare circuit 83 to be a poll message, then a signal indicating this fact is sent via a lead 85 to a timing and control circuit 86. In response, control circuit 86 sends a message back to the central processor. The exact message sent depends on whether or not the modem had previously received from control unit 30, the number of a credit card to be checked. This number is stored in a RAM 87 by means of signals from output port 56.

IF RAM 87 has a credit card number stored therein, then this number is sent through a multiplexor 88 and through transmitters, 81b to the remote processor. Conversely, if RAM 87 has no credit card number stored therein, then a canned message is read from ROM 89 and sent through multiplexor 88 and transmitters 81b, to the central processor. Timing signals for these transmissions are generated by control circuit 86 on leads 90.

When the central processor receives a credit card number to be checked, it responds with a message on interface 80. Again, this message is stored in the message RAM 82. Subsequently, the message in RAM 82 is sent to compare circuit 83 for comparison with the messages in ROM 84. This time, the received message will indicate either a good credit status or a bad credit status. Circuit 83 operates to generate signals on leads 91 indicating which message was received. These messages are subsequently interrogated through inport port 66 by microprocessor 50.

Figure 6:
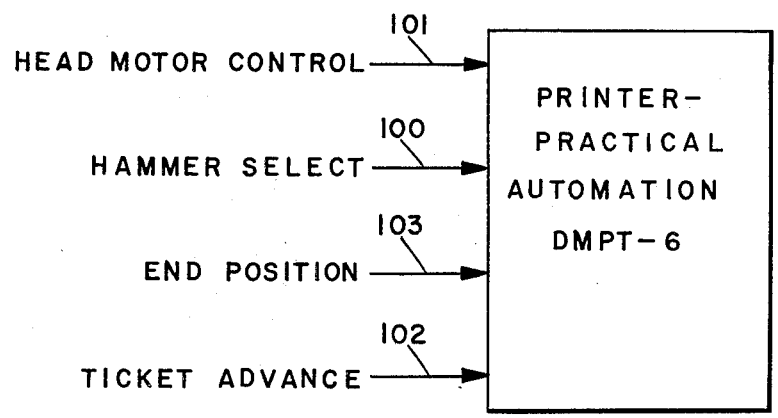
FIG. 6 is a detailed block diagram of the printer module of FIG. 2.

Referring now to FIG. 6, details of the printer control module will be described. Basically, this module consists only of output port 54 and input port 64. Signals from output port 54 includes 7 hammer select signals 100, a head motor control signal 101, and a ticket advance signal 102. Similarly, signals to input port 64 consists of two end position sense signals 103. These signals are sent to/received from a Practical Automation printer having model number DMPT-6.

In operation, control unit 30 first monitors the end position signals to determine if the print head is in a position where printing can begin. One of the end position signals indicates that the print head is in an extreme left position and thus printing can begin from left to right; whereas the other signal indicates that the print head is in an extreme right position and printing can begin from right to left. Upon detection of one of the signals, the head motor control signal is sent. This causes the print head to move in a lateral direction in a predetermined speed. Subsequently, in synchronization with this speed, various hammer select signals are sent to the printer. To print one character, these signals are held true for 600 milliseconds, and are turned off for 1000 milliseconds. All of this timing and signal selection is accounted for by the microprocessor 80.

The above described character by character printing continues until one full line is printed. Subsequently, the ticket advance signal is sent to the printer. In response, the ticket is moved to a new line. Then printing of that new line continues as described above. A total of four lines are printed on each ticket.

Card reader module 35, timer module 36, and tape cassette module 32 also have standardized interfaces similar to that described above for the printer. Their control is implemented by sending signals to and receiving signals from the corresponding output and input ports. The actual card reader used in terminal 10 is the model 40 magnetic strip card reader that is manufactured by American Magnetics Corporation. Similarly, the actual timer that is used in terminal 10 includes a semiconductor chip number 5880N that is manufactured by NSC Corporation. This chip gives the seconds, minutes, hours, and months. The year is set in by hand via several switches. And, the actual tape cassette that is used in terminal 10 is a model 250B with option 214 that is manufactured by MFE Corporation. Further, details on the interface to each of these components is available from their respective manufacturers.

A preferred embodiment of the invention has now been described in detail. In addition, various changes and modifications may be made thereto without departing from the nature and spirit of the invention. Therefore, it is to be understood that the invention is not limited to said details but is defined by the appended claims.

TABLE 1

```
         Address    Data
:20000001BE41C341003E4FC33A004C
·10003820B44D3003E69D305761603CD7C13CD137A
·12004800160DAE720CD75220D97020D7301DE27663
:10005800420C0030CDEA0BCD022CCD320CCD4A2C0B
·10006800CD6A0CCDA50C3E01D325C33E203F10D30B
·10007900206AFD30D302D303D3053E303323241D37
·10008800243F24D326323441211840222041090E3R
·10009800011FF17CD1615DA380021C341220941ED
·20003A001F02CD7106C9110243D1
:1000B1002018001AF12130B7EB102B400C9CD6423BA
·1000C1003A2F41E620323F41D321DE2656140ADE76
·1000D1000011F1FDAF302CDD407C3CB30DB031FED
:1000E100D0DF1E3E21D320DB0907DA6105DB21E643
·1000F10002041307C3CB303E20D3050EFFCD7C05FA
·1301010D20C213F0132384103E503CDFF02DAE5ED
:10011100203CD1A03CD3623DAF103CDC704DAF10537
:090121020CD2304CDAD24CDBA24D3
·10012A200CDA204CD7104CDAD83E02D305214241DF
:10013A003600233600233600CD790E21FE4136FFFE
·10014A000CDD825DAF103CDC425CDAC053A42410556
·10015A00053242410DFA3CCDEA0A3A3441F01503BA
·10016A0006E6FF323441D306CD1906C3FC0116D573
:10017A000DB21F610C0AFF681D321322F4101C80375
·10018A000CDC8157A2F41F640322F41D301010235PF
:29019A000CDC81EDB01E608EA
:1001A100CA3605A2F41E6BE322F41D301010004044
·10018100079B7C2B1017AB7CA0701DB21F6130CA36
:10010100B101DB21F610CA4A053E8E322F41D3014F
:1001D103F1132284108660D8603CDCD073A2F=11C
·1301E100F671322F41D301AFD3020C9DB061F47DCD
:1201F1003A067B1F47DCCA08781F1F1F47D4DFC2
:13022100087801F1FD212023A3441E6FE323441D33C
·0002110052120414FDB05F6F34F
:17021A0001F650FE50CCBA092139417E1F1FDA3ADE
:12022A2022DB0517D247221717017DCC225C3472B9
·17023A201FDA4702DB05F6F0FE40CCC2223A394134
·12024A2017DACB2317TA130417DAF003F638FF38BC
·12025A20C2F001CDF30B1E020CD7106F4C324241A6
:12026A20210042AF7723F72377CD2D0BCDDF13D25E
·12027A202023A384117DA6105170A6A0517DAEF18
:09028A20517DA740576CD4B0D5E
:13029A03A2741F521024A0521F041CDAD02CDEA34
:1002A3002B21BD41CDAD02C3BD27E3C2777EBD0D0
·17023B207FC8012777234DAB302C93A2741E650CA03
·13020C3204A05DP21E623C2C502CDJ22CCDAE00CD4E
:1002D3007500CD7801AF9412B22F941AFBCC26FDA
:1002E3000RDC26E0035603003E02D305DB031F92
```

TABLE 1 Continued

```
:1002F30002F002CDDF120000000036E0021004077E9
:280303003CFE1003233DFEF8EB
:10030B0020203AFC93A3841F60232384137C9113C
:10031B0000040212F401A1F1F1FE60F77231FE0FDD
:10032B00C220031A1F1F1FE61F77C91600212E407C
:10033B007EFE0BC24D03237EFE04DA8003FE06DA3B
:10034B0057033A3841F60432384137C923FE00DAEC
:10035B006003C34D03007EFE02C27C03237FFE00BE
:10036B00C27C03237EFF04C27C03237EFF09CA4D9E
:07037B00031E01AFC9FE03E0
:10038B00DAAB03237FFE08CA9103FE00C294031E69
:10039B0006C9FE07DA4D03FE08DAA2031E05AFC93D
:1003AB00FF08CA9103LE01AFC9FE00CAC003FE02C5
:1003BB0024D03237EFE05C24D031E21AFC9232396
:1003CB007FFE05C24D03C3600311E44021C9410600
:1003DB002ACD5115CDC607CDAE00CD7500CDD308BF
:1003EB00C36F003A3B413C323B41FE03DA0504CD89
:2C03F200F703C3D9033E08D30548
:1003FB001EDACDC6071DC2FD03C9F5CDAE00F132F5
:10040B003B41CD7500C36F00CDF7033A3441E6FE98
:10041B00323441D306C3CB0321B9417EF60F4723C8
:10042B000E047EF60F80274723DC22D042B0E05ED
:10043B007E1F1F1F1FE60F8027472B0DC23B04217A
:10044B0004077373E99CE0096C607274FDA6204F5
:10045B003E9A9177C34E04FF00CA68047EF60FCD28
:09046B00320E32BA40C911C44145
:1004740021684C1A07070727F5CD8A04F123070707
:10048B00707CD8A04C9E60FFE0ADA9704C6902747
:10049400CE3027FE00C29E043E0A77C9119940213E
:1004A40014106037ECD4006C911B44021BB4106BB
:1004B40037ECD4006C911B04021B94106027ECD6C
:1004C4040060CD5212F400E28CD5D062A35411996
:1004D4077070707E6F023A84F237E070707070CB
:0904E400E6F023AF4721C1415EA0
:1004ED00223235CCD9615D2F904D1AFC93A3841F62A
:1004FD0008323841D137C911C94121E440062CCDDC
:10050D0011521C9415E23562A35412B2B2B2B2BFF
:10051D002EB06031A772311305C221053EF5BDC249
:10052D00322521CB4122C9410915CA4A053A2F418D
:10053D00F630322F41D301CDC607C37A013E48D3F1
:10054D003A2F41F660322F41D3013EB0D3043E35
:08055D0023D305763EC0D3006F
:1005650 03F08D305763F50C363053EC0C363053ED2
:10057500020036305112E40216A401AEE0FFF0ADABC
:10058500 8D05C690027C630 27FE00C294053E0A771A
:1005950 3A42413C3242412031B1AF60FFE0F131328
:1005A500C27F05F243410921644036 3F23363F239D
:1005B5003AC0417233361C2A4343161D2323233673
:1005C50 3F23363E23360F23363721A54036312308
:2905D50 641C92135415E23566F
```

TABLE 1 Continued

```
           Address          Data
           ┌──┴──┐  ┌─────────┴─────────┐
:1005DE00 1B1B1B1B1B321C341D506031ABEC200BA
:1005FF00061322305C2FA053A37413C323741FE0570
:1005FE00DA110ED13A3941FE08323941370923205AE
:10060F00C20C0D17E2FB7C2E705C912E4011BB01
:13061F00400061F7FE60FCD3206121323057AFE002D
:10062F020C210EC9FE0ADA3D06E6F73DFE40C9FED6
:10063F0030C973E6F00F0F0F0FCD320612137EE095
·0D064E000FCD320612132320578CA
:10065700FE00C2400EC97EFF0DCA6A0E0D23C25DB2
:10066700063709AF223541AFC9C93A3241E340D33F
:10067700004CDCD073A3241FEBFD304CDCD071DC225
:10068700071061640188130DCD815AFCD9B06CDCBD7
:100697000E03FC06DB0017DA9B06DB004 7E680CAC9
:1006A700A106210340738E60F77DB20171 7DAE006BB
:1006B700DB0047E640CAB706210240781717170172D
·0006C700E6F077C9DB00E62034
:1006CF00C2CB06DB0047E620CAD2262101403478E6FE
:1006DF002F77DB02E610C7E106DB0047FE10CAE841
:1006EF0006210040 7817171717E6F077C92100 4049
:1006FF007E23B632C141237E23B632C241CDA00440
:10070F00CD320CC911004001070CDB4003A32417F
:10071F00E67F323241D30421064 0CD9513CDAF076A
:10072F00AF3207407FFE01CA4907FE02CA6007FECC
:00073F0003CA7707FE04CA8E0705
:10074800C9CDD2062100407E23B632BE41CD1A0C57
:10075800DB01E601C24907C9CDA106210240 7E237B
:10076800B632BF41CD1A0CDB01E601C26007C9CD24
:10077800D2062100407E23B632C141CD320CDB01C6
·10078800E601C27707C9CDA1062102407E23B63211
:1007980022410D320CDB01E601C28E07C9DB01EE9E
:1007A800C2CAB707CD9513DB01E602C2AF0734DBF7
·0707B800DB01E601CAA50 7C913
:1007BF00102000DC815C901A861CDC815C901989E
:1007CF003ACDC815C9DB0517171717E6F01747DA23
·1007DF00720817DA2908017DA04 0817DA0B08DB048E
:1007EF0021B34177CD020C11B4400E01CD40061E5E
:1007FF002CD7C13C917DA3403C31A08DB0421BCF5
·10083F0041 77CD020C11B6403F907DB0421BD417E
:10081F0077CD020C11B8400C3F90717DA4D0817DA74
:0708 2F0054 08C34 3 08D3 04 79
·10083F00210341 77CD320C119D40C3F907DB04215A
:1008460020441 77CD4A2C0917DA7A08C36308D304BA
:10085F002139417 7CD6A0C11B040C3F907DB0421F9
·1008 6F00BA4177CD6A0C11B240C3F90717D817FA
:10087F00D2AF28C91E00 21A017DB04 20003244419D
:10088F00DB45F87535F1E306032105411 A77133E3
·1008 9F002305C293 08CDA238CD840CC921A7481117
:0708 A600C5 410F23CD900 AC903
```

TABLE 1 Continued

```
                Address           Data
                ┌──────┴──────┐┌─────────────────────┴─────────────────────┐
:1008AE00DB2432C84132E742CDA50CC93A3941F656
:1008BE0001C3CF083A3941F6A1C3CF083A3941F600
:1008CF0040323941C93A3441F680D306FE7FD30E29
:1008DF00C9214041160CAFDB02171717DA4009177E
:1008EE00DAF3091717DABB0917DAA90917DA30099C
:1008FF0036201E00D5CDD70AD1CD990A7FFF41C233
:10090F0019093A3941F680323941C93A3941F6026C
:07091E00323941DB05E3F070
:100925003229413E24D3053F04D3053A40413232B3
:109350041D304C936211E03C3020917DACB0317B5
:100945C0F53A3941E602C2502C9F1C9F1D29409D507
:100955000DA20811A74021AD400E03CD900ACDB11F
:100965000A3E0CD305233341D12134417EE6F377EF
:100975D0D3062139417EF624772129414EDB05E670
:100985000FC81773A3341F620D305E6DFD305C93E3A
:09995005DD305323341A21AD407D
:10099E0036202336202336202C36F0917DAB4093E6E3
:1009AF00221F0EC3020936231E09C3020917DAD115
:1009BE000917DACA0936241ECC3020936251E0F82
:1009CE00C3020917DADC0936261E12C302093627BE
:1009DF001E15C3020917DA3B0A17DA130A17DA01D2
:1009EE000A17DAFA0936281E18C3020936291E1B01
:1009FF00C3020917DA2C0A362A1E1EC32209362B49
:090A0F001E21C3020917DA290AAE
:100A170017DA220A362C1E24C302093E2D1E27C3D5
:100A270020917DA340A362F1E2AC30209362F1E88
:100A370002DC302090917DA680A17DA560A17DA4FC0
:100A47000A36301E30C3020936311E33C3020917E6
:100A5700DA610A36321E36C302093633E9C30239B
:100A670000917DA7E0A17DA770A36341E3CC30209F9
:100A77003636351F3FC3020917DA890A36361F42C3C6
:090A87002093E6371F45C30209BD
:100A90001A7713230DC8C3906A6E0321011719119F1
:100AA000CF40CD400621DF40119F400606CD5115E6
:100AB000C921A440012700DC87EE60F872780CC24
:100AC0009227F5E60FF630772BF1D2D20A0601C354
:100AD0003720A0600C3370A06032150171SEB21AA6B
:100AE00431A77132305C2E10AC92158401E0706A0
:100AF0041567A762032344D3067A17571DCA0789
:090320002BCD1F0BC3F20A1E0707
```

TABLE 1 Cont'd.

```
                  Address  Data
                  ┌──┴──┐ ┌──┴──┐
:100B8000230502F10A1E7AAF323441D306CD1F0E3A
:100B1001DC7100PC93A3441F64OD30E6CBF323442
:100B2000041D306C91199400101A01A67131A6F131D
:100B39001A751F081F577D1F6F7C1F67D24D0BA941
:100B4900677DA86F7A1DC20D0BD13A42413D3242C1
:100B590041C2360B137D121B7C12C90EFF3A2F417B
:100B6900F610D3013A2F41E6EFD301322F410DC2DE
:000B7900660BC93A2F41E6DFCB
:100B3100D301322F41CD8A0BC91100403E10120111
:100B9100FF02AFC3A20F3A2F41F610D301F6FFD30A
:100BA10001DB0317781F47E658FF58CAB50B0DC283
:100BB100070B3709781213C3D80B3A2F41F610D3CC
:100BC1001E6EFD301DB03171A1F12D2BB0B132A65
:100BD1002C417TBBCADE0B3E1012C3BB0B3A2F4129
:100BE100F6CF322F41D301AFC9E553A3241E67F3238
:070BF1003241D3042130A4317
:100BF80011F6410E03CDDB0CE1C9E53A3241E67F3F
:100C0800323241D304210043113B41E03CDDB0C2A
:100C1800E109E53A3241F67F323241D30421084343
:100C2800011BF410E02CDDB0CE1C9E53A3241E67F47
:100C3800323241D304011043110410E03CDDB0CE4
:100C4300E109E53A3241F67F323241D30421184303
:100C58001104410E01CDDB0C000000000000000B3
:080C6800E109F53A3241F67FE3
:100C7000323241D30421204311B9410F02CDDB0CA5
:100C8000000F109E53A3241F67F323241D304E126
:100C9000284BDB043244411144410E01CDDB2C00FA
:100CA000000000E109E53A3241F67F323241D30427
:100CB00021304311C8410E01CDDB0C0000000000C3
:100CC00000E109C90000360F23360F230DC2C60C40
:100CD00003A3241F603023241D304C91A47070707036
:090CF0007F60F772378E60F7791
:100CE0001323DDC2DB0C3A3241F630323241D30470
:100CF000C9116640CD3F0DE913F5CD3F0DF1790659
:100D0000060D310D4F7DCD310DD21A0DEE21CD32EB
:100D190006F7905C20A0D3A42413D324241C20185
:100D2000D7DCD400D7912C91FF5P7F23P0DE81FB3
:100D390062267F17CC91A0100060F6779174F7C35
:100D490005C2430DC911D007010100DB01E610C23C
:080D59006A0DCDCA0E1B7AB32E
:100D6100C2510D3F01322741C9DB01E604C27B0DB2
:100D7100C0DD90DB01E604CA640D3E113228411AF24
:100D8100322941067BCD860FDB01E612C2640D3EA4
:100D91001322A41AF323412104200EF077230511
:100DA100C20E0D3A2A413DF5CC500FF13DF5CC2DD7
:100DB1010F13DF5CCE910F13DF5CC0011F13F808B
:100DC1000D3033A2941B7CA240FCD000F018002CDF9
:090DD100A0EDB21B604C0D300DD9
```

TABLE 1 cont'd.

```
            Address           Data
           ┌──┴──┐   ┌──────────┴──────────┐
:100DDA00210040E5CD1C3FE1012F02CDCA0E3A29D0
:100DEA0041B7CA172E25E51313132605C5CD3CF5
:100DFA000F1BC105C2F70DC3250ECD0E2F018002D0
:100E2A00CDCA0EDB06E640C20D0FC3DA0D23E50697
:100F1A0025C5CD3C0F13C105C21B0E0112000CDCA78
:100E2A000FE13A2B413C322341FE50CA470EE5CD2A
:100F3A001C0FE13A2941B70AEF0DC3170EDF01E6D1
:080E4A0040C2550EDB06E64070
:100E5200CA470EAFD302D3033A2A413C322A41FE9B
:100E620025CA750E060FCD860E3A29412F32294149
:100E7200C3950D06FACD860EAFD3023A2741E6801E
:100E8200322741C93A2841D302FE11CA9F0EFE12EF
:100F9200CAA40FFE14CAA90E3F11C3AB0E3F12C363
:100EA200AB0E3F14C3AB0E3F18322841C5013800CA
:100EB200CDCA0EDB01E620CAC40E3A2741F68032C3
:090EC2002741C105C8C3860FD505
:100EC300160315C20D0ED10B790C8C3CA0FCD0017
:100EDB000F2664C501C800CDCA0EC1D301E604C212
:100EEB00F50E05C2DE0EC1C3640D3A3041E53FD3A9
:100EFB0002323041C9AFD302013200CDCA0E3E805F
:100F0300D302C9AFD302013200CDCA0E3E40D30289
:100F1B00C9117D117EB7CA370FFE2EDA370FFE5B74
:100F2B00D2370FDE2D0783D2360F145FEB5E2356C5
:070F3B00C91AD3030108000ED
:100F4200CDCA0E3E80D303010C00CDCA0EC9210406
:100F520040119940CDEB0F0E23CDFA0F0104011AAF
:100F6200B7C2630F2313C3720F0601CDF10F0DC271
:100F7200061DF36FE230602CDF10F0604CDFA0F11B2
:100F8200AD401AF620FF20CAAA0F119940CDDB0F10
:100F92000606CDFA0F11AA400603CDF10F362F2314
:100FA200633CDF10FC3BA0FCD0010060ACDFA0F1A
:080FB200CD0210062EC3BC0FC0
:100FBA00604CDFA0F119940CDDB0F0605CDFA2FC5
:100FCA0011A7400603CDF10F362F230623CDF10FEB
:100FDA00C90622CDF10F362F230602CDF10F362FA7
:100FEA002306020DF10FC91A771323005C2F10FC9DF
:100FFA002305C2FA0FC9365623364F2336492336FC
:10100A0044230921044011AD401AB7CA1E1011E386
:10101A0040C3211011A44006020DD310362E23015D
:091022A00040311AB7C23610231BA1
:101033200C33B10E01CDD310DC22C100608CDFA08
:1010430020F11A640060200DD310060700DFA0F11AD3E
:101053300401AF620FE20CA8D1011F3400602CDD3CC
:101063221036230104011AB7C2741023100CDFA0F11E5
:10107320010061CDD3100DC26A12060BCDFA0F11E5
:10108320A6430622CDD312C30C120CDDC10060ACDFE
:10103200FA0FCDDC100605CDFA0F11AF401AE6222A
:0710A300FF20CAB310060392
```

TABLE 1 cont'd.

```
       Address         Data
       ┌──┴──┐  ┌───────┴───────┐
:1010AA00CDD3103E2F23C3FF100603CDFA0F1B1FEB
:1010BA0130E603CDD3103E2F230603CDD310262328
:1010CA00CDFA0F0602CDD310C91A77231B05C2D356
:1010DA010C93644233649233364F23336562309211AD
:1010EA0004400F0311B040060BCDF10F060ECDFAF7
:1010FA000F0DC2EE10C911B0400E001AFE44CA10F0
:10110A0011130CC325111B2104403E139147CA2039
:07111A0011000CDFA0F41A6
:1011210CDD310060CDFA0F11AD401AF622FE22F1
:101131000A5D1111BB4079835FD23E111441CDD3F9
:10114100103E1091DA5511C250110E08C35711260D
:10115100CC357110626CDFA0FC36A110607CDFA63
:1311610CDC10060CDFA0F11BB4079835F0066
:10117100D2E611144100CDD310C98D129712FF
:1011810092120911DE11F311F811FD11F211F711EB
:0811910FC110112061E8D127F
:101199008D128D128D128D128D128D122B1210124D
:1011A9015121A121F12241229122E123312381272
:1011B903D12421247124C1251125612581260122
:1011C9026512EA126F1274127912E1263128812D2
:1011D90B5D10C9C5BE6181FFA191B1C9C5C3A1C68F
:1011E90F9D1C1C184FFA4948CCED1D1D1F2C6C9F1
:1011F900C9A99FF0D0C8C4C3B6C9C9C9B6BCCAC9C1
:0912090C9B19FA4C4A9FB6C999
:10121200C9C9FFA2C1C1C1BE9CA2C1C1FFC1C9C988
:10122200C9FFC0C8C8C8FFAFC9C1C1FFTF8888884D
:10123200FFC1C1FFC1C1C0FFC1C182C1A29488FF69
:10124200918191B1FFFFA093A0FFFF9688B2FFBE49
:10125200C1C1C1BFB0C8C8C8FFBDC2C5C1BFB1CA46
:10126200CC8FFA6C9C9C9B2C0C0FFC0C0FE318137
:10127200S1FFF08C838CF0FF828C82FFE394889451
:09128200F3F0888788F0E1D1C98E
:1012B900C5C3B0620B0680E090S88483808380346
:10129B0080E3F40D3003E32D318D3293E41322E411B
:1012AB00D300DB081E0A06000E00DB09E620C2CBCA
:1012BB0120B7937C2B5127837C2B5121DC2B112F3
:1012CB03F400300AFD31BD309CD8E133A2E41D362
:1012DB000DF08C921994063A233645233364F2384
:1012EB03646263C233E20770SC2EF123E40324283
:0712FB041CD2D0BCDDB13EF
:10130200D20813C37C023E08D30SCD9C12000000014
:10131200D3009070212133EC1D300CD5A13DB09027F2
:10132200DA1F13CD5A13CD5A13DB0907DA1F133E0A
:1013320041D300CD5A13CD9C120000000CD6313CLD2
:10134200C812DB031FDA4413E01D305AFD30021D6
:10135200F9413EFF23360209160SCD7C13C90000C9
:10136200000D3083E40D3003E09D318D309CD7A13DF
```

TABLE 1 cont'd.

```
                Data
       Address ┌─────────┐
        ┌──┐
:2S13720203A2F41D300D329C94A
:10137A0016007153C3CDC8151SC27C13C0018025B2
:10138A220DC815C901F22ECDC815C901A0E1CDC8BF
:10139A0015C901D417CDC815C901B00CCDC815C906
:1313AA0001DC030DC815C93A3E41BDC2BD1337227D
:1013BA003C41C9AF223C41C9E52A3C413A3F41BCC4
:1213CA02C2D5133A3E41BDC2D51337232230411E16F
:1313DA00C9CDF014D821DD40223F41219940223C5A
:0813FA0041CDF213D8C35B14DF
:1213F2003701D300DB0907DA1115F302C21C153ED5
:101402020170320DB08AFD3003E09D318D30CD273F
:1214120013AFD3003E5SD318D30A3E01D300DB08E5
:10142200AFD3003E09D318D30CD05133E01D30CA3
:10143200DB0AFD232143E00D300D31AD30B3F2026
:10144200D318D30B3F01D300DB0A0FD24A14AFD319
:10145202C03E5SD318D30BAFC9119040S21F4403E40
:0914620001D300DB08DB0A0FD7
:10146A00D29C14E52A3C413FDABDC28A14AFD300AD
:12147A003F89D318D30CD3015E1DAAD14C39C14D3
:10148A003FDBBDC28014AFD3003E09D318D30C3D3
:12149A20S2143F01D300DB03F620C2E714CD3D15SC
:1014AA00C36714FS323C41212841223E41E13E0125
:1014BA00D3220DP03E523C2C614CD3D15CDB113D24D
:1014CA003C14CD9C13AFD3003E08D318D30C9DA3C7
:0914DA0013AFD318D30921994086
:1214E30011F54006440CDD815DA2615AFC93E01D324
:1214F300000DB02DB0907DA11150707DA2215C93A19
:101S03003841F610323841AFD300D30937C93A38DE
:1015130041F60232384103A0153A3941F620323851
:101S2300413FC93A3841F64232384137C9AFD300E1
:101S33001AD313D30BCDC21313C907070000003EF3
:10154300001D300DB0B7723013A410A3C02C9F5C5FD
:071SS300D5FE1A772313050CB
:10155A00C2551SC3F215F5C5D5E5AF7723C0265A4
:10156A0015C3F215F5C51600S5AB7CA86154FAF3C14
:10157A0083275F3F00SA2570DC27815C1F1C9EF56
:101S8A0677983274F788A27477CE1C9E567373F21
```

TABLE 1 cont'd

```
          Address   Data
             |        |
:12159A020090CF00931274F3F99CE03928227477CAF
:1215AA20E1C9C5F50F00070707707E60F470EFAC2A6
:1215BA00153E0AE14FC39715F1E60F81C1C9F5C53A
·0215CA000B79B7C2CA1570E70E
:1215F2000C2CA15C1F1C9FEC5D5F51ABFC2EA1513CF
:1215E2002325C2DC15C3F215E1D1C1F137C9E1D140
:1215F200C1F1B7C900210000CD0716799B7C82B96F3
:1216220023030773700AF144F7C3AC8793623C309F9
:12161200016AF2F472100003GER2100407G237B3D1C
:13162220C21F167ABCC21E1621004207EB8C25F16C8
:12163200237BBD022D167A3CC22D1604CA1B1E0608
:08164200FF21FF414E767EB84C
:1216A00C25F16717EB9C25F162P7BBDC2481604F5
:021E5A20CA4316AFC971C30E0179A
:12170100003600002015200041850015000040070072
:121711000402200420000042000004200000400AAAAA34
:1017210AAAAAAAAAAAAAAAAAAAAAAAAAAAAAAAAAAA18
:1217310AAAAAAAAAAAAAAAAAAAAAAAAAAAAAAAAAAA208
:991741000AAAAAAAAAAAAAAAA53
:1217A002464154425552544564C4C474240414584D78
:1017B02005259F4F41484F4F54534D4653414E534651
:371703034F534A43534344B12
:101752004641544255525454564C4C41584D52594FA3
:101760200414B534D4653464F534A435344B20201E
:0417703002020002220F5
:02000001FF
```

We claim:

1. An automated system for issuing airline tickets in response to purchases by credit card without the intervention of any ticket agent, the system being comprised of a plurality of electro-mechanical ticket terminals which communicate with a central computer adapted to determine whether a cardholder's credit is good or bad, wherein each of the ticket terminals includes:

credit card reader means for reading data from a credit card inserted therein by a ticket purchaser;

destination selection means for enabling the ticket purchaser to manually select a destination from a predetermined set of destinations, including a visual display for directing the ticket purchaser through a sequence of selection steps;

means for performing a predetermined sequence of status checks based on the data read by the credit card reader means, the status checks being performed without communicating with the central computer, and including a parity check, a check on the type of card, a check as to whether the card has expired, and check on the number of purchases made with the card at the ticket terminal;

modem means for transmitting signals identifying the credit card to the central computer conditional on the status checking means indicating passage of all of the status checks, and for receiving signals from the central computer indicating whether the cardholder's credit is good or bad;

means for calculating a fare based on the selected destination;

vending means for printing and dispensing a ticket to the selected destination conditional on the signals received from the central computer indicating good credit; and means for recording data representative of each ticket dispensing transaction on a removable storage medium.

2. A system according to claim 1, wherein the fare calculating means for each of the ticket terminals includes at least one removable ROM element having data stored therein representative of pricing information corresponding to the set of destinations from which fares can be calculated.

3. A system according to claim 1, wherein each ticket terminal further includes a plurality of terminal identification switches, the preselected setting of which uniquely identifies a particular ticket terminal.

4. A system according to claim 1, wherein the destination selection means for each of the ticket terminals includes means for enabling the ticket purchaser to select a one way ticket or a round trip ticket.

* * * * *